United States Patent [19]

Yu et al.

[11] Patent Number: 4,643,741

[45] Date of Patent: Feb. 17, 1987

[54] THERMOSTABLE POLYCRYSTALLINE DIAMOND BODY, METHOD AND MOLD FOR PRODUCING SAME

[76] Inventors: Hongchang Yu; Zhen Yang; Chaodong Wang; Zhongqing Zai, all of Research Institute for Abrasives & Grinding, Ministry of Machine Building Industry, Huashan Road, Zhengzhou, Henan, China

[21] Appl. No.: 681,549

[22] Filed: Dec. 14, 1984

[51] Int. Cl.$^4$ ............................................. B24B 1/00
[52] U.S. Cl. ........................................ 51/295; 51/308
[58] Field of Search ................................. 51/295, 308

[56] References Cited

U.S. PATENT DOCUMENTS

| | | | |
|---|---|---|---|
| 3,306,705 | 2/1967 | Lineweber et al. | 51/308 |
| 3,520,667 | 7/1970 | Taylor | 51/295 |
| 3,684,004 | 8/1972 | Germain et al. | 249/114 |
| 3,911,994 | 10/1975 | Truman | 249/114 |
| 4,171,339 | 10/1979 | Lee et al. | 51/308 |
| 4,469,655 | 9/1984 | Kiss | 264/82 |

Primary Examiner—Lorenzo B. Hayes
Assistant Examiner—Willie J. Thompson
Attorney, Agent, or Firm—Morgan & Finnegan

[57] ABSTRACT

A thermostable polycrystalline diamond body is produced by pre-treating the diamond crystals with molten base or salt, mixing the pre-treated diamond crystals with silicon powder or a blend of silicon and one or more substances, subjecting the mixture to a combination of high-pressure and high-temperature and maintaining the pressure and temperature for a period of time. The thermostable polycrystalline diamond body is characterized in having diamond crystals uniformly distributed in the body. The diamond crystals are covered by β-silicon carbide and that the diamond crystals together with β-silicon carbide form an uninterrupted framework throughout the entire body, the interstices of which are filled with elemental silicon or silicon-containing refractory phases. A polygonal graphite mold having walls of equal thickness useful in the production of said thermostable polycrystalline diamond body is also provided.

50 Claims, 8 Drawing Figures

THERMOSTABLE POLYCRYSTALLINE DIAMOND BODY, METHOD AND MOLD FOR PRODUCING SAME

BACKGROUND OF THE INVENTION

The invention relates to a thermostable polycrystalline diamond body, a method and a novel polygonal mold with walls of equal thickness for production of same. The thermostable polycrystalline diamond body of the present invention can be made into tools, such as drilling bits, wire drawing dies as well as wear-resistant components by way of high-temperature brazing or high-temperature sintering.

Conventionally, polycrystalline diamond is made by bonding diamond powder into a composite body. Due to the random orientation of the component crystals and the isotropic characteristics, a polycrystalline diamond is superior to a single crystal diamond in terms of impact resistance and wear uniformity. Tools made of polycrystalline diamond are suitable for working under more severe conditions. For instance, polycrystalline diamond cutting tools can be used for discontinuous cutting; polycrystalline diamond mining and oil drilling bits are suitable for more abrasive or broken formations; and polycrystalline wire drawing dies have an average life span 2 to 5 times that of dies made from single crystal diamond. Further because the starting material are mass produced, it is much easier and cheaper to obtain. For these reasons, there have been important developments in this field since early 1970s.

Methods of producing polycrystalline diamond have been described in U.S. Pat. No. 4,168,957 to Lee et al. and U.S. Pat. No. 3,819,814 to Pope.

Further, U.S. Pat. No. 3,913,280 to Hall, U.S. Pat. No. 3,574,580 to Stromberg, U.S. Pat. No. 4,124,401 to Lee et al. and U.S. Pat. No. 3,819,814 to Pope describe the use of silicon, its alloys or compounds as additives to improve the properties of polycrystalline diamonds.

However, none of these patents provide a thermostable polycrystalline diamond product of sufficient good quality, a method for producing thermostable polycrystalline diamond, or a method for producing a polygonal, preferably a trigonal polycrystalline diamond body with uniform wear resistance by direct molding under high pressure and high temperature.

One significant advantage of the present polycrystalline diamond product is that it has high thermostability. The product can withstand high temperatures of about 1250° C. or above in a non-oxidizing atmosphere. Moreover the relative wear resistance of the polycrystalline diamond body remains the same or is improved by high temperature treatment. Because of these excellent properties, the product of the present invention can be made into tools and other articles by means of high-temperature brazing or high-temperature sintering.

The present invention provides a method of producing thermostable polycrystalline diamond bodies wherein the microstructure is different from previously known polycrystalline diamond bodies.

Conventionally, a polygonal polycrystalline diamond body is produced by cutting a large polycrystalline diamond body into the desired shape and size by means of an electric spark or a laser beam. The production cost is very high, much higher than direct molding. Trigonal or polygonal polycrystalline diamond bodies can also be produced by using a conventional mold with a round cross-section and a trigonal or polygonal cavity. However, when such a mold is used, the wear resistance of the product is not uniform, that is to say, there are variations between the wear resistance of the surfaces and the edges of the product. This results from the difference in temperature produced at the edges and on the surfaces during the high-pressure high-temperature sintering process, since the walls of the mold are not of the same thickness.

BRIEF SUMMARY AND OBJECTS OF THE INVENTION

It is a primary object of the present invention to provide polycrystalline diamond having sufficient hardness and wear resistance and high thermostability for making tools or articles by means of high temperature brazing or high temperature sintering.

Another object of the present invention is to provide a process for making thermostable polycrystalline diamond.

A further object of the present invention is to provide a method for controlling the properties of a polycrystalline diamond product, its hardness, strength, wear resistance, thermostability, etc., to meet differing demands.

Still further, it is an object of the present invention to provide a new polygonal, particularly a trigonal mold to directly mold polygonal or trigonal polycrystalline diamond bodies with uniform relative wear resistance by high-pressure and high-temperature sintering.

According to the present invention, a thermostable polycrystalline diamond body is provided. The polycrystalline diamond body comprises a mass of diamond crystals, $\beta$-silicon carbide and elemental silicon. The diamond crystals are uniformly distributed throughout said polycrystalline diamond body, and the surfaces of the diamond crystals are covered with $\beta$-silicon carbide and chemically and adherently bonded therewith. The diamond crystals together with the $\beta$-silicon carbide form an uninterrupted framework throughout said polycrystalline diamond body. The interstices of the body are filled with elemental silicon which is chemically and adherently bonded to $\beta$-silicon carbide. The grit size of the diamond crystals ranges from 1 to 150 microns and are present in an amount of 70% to 99% by weight of the total weight of the polycrystalline diamond body.

The thermostable polycrystalline diamond body may further comprise a mass of diamond crystals, $\beta$-silicon carbide and a silicon-containing refractory phase. The diamond crystals are uniformly distributed throughout the polycrystalline diamond body, and the surfaces of said diamond crystals are covered with $\beta$-siicon carbide and chemically and adherently bonded therewith. The diamond crystals together with $\beta$-silicon carbide form an uninterrupted framework throughout the polycrystalline diamond body. The interstices of the body are filled with a silicon-containing refractory phase which is chemically and adherently bonded to $\beta$-silicon carbide. The silicon-containing refractory phase consists essentially of elemental silicon and one or more substances selected from the group consisting of boron carbide, silicon carbide, a silicide of one or more elemental materials, or a solid solution of one or more elemental materials in silicon and mixtures thereof. The elemental material is selected from the group consisting of boron, titanium, nickel, cobalt, zirconium, niobium, molybdenum, vanadium, hafnium, chromium, an element of the lanthanum series of the periodic table, and alloys thereof. The amount of the elemental materials, boron carbide and/or silicon carbide is less than the total amount of silicon present including elemental silicon and compounds of silicon. The grit size of the diamond crystals ranges from 1 to 150 microns and are present in an amount 70% to 99% by weight of the total weight of the polycrystalline diamond body.

According to the present invention, a method for making a thermostable polycrystalline diamond body is provided. The method comprises: (1) pre-treating diamond crystals with a molten base or a molten salt; (2) mixing the pre-treated diamond crystals uniformly with silicon powder or a blend of silicon powder and a material which will form a refractory phase with silicon wherein the elemental material is selected from the group consisting of boron, titanium, nickel, cobalt, zirconium, niobium, molybdenum, vanadium, hafnium, chromium, an element of the lanthanum series and alloys thereof; (3) placing the mixture into a mold with the desired final configuration of the body; (4) placing the mold into the hole of a pre-formed pyrophyllite sample cube; (5) placing the sample cube into an apparatus which can produce high-temperature and high-pressure along three axes simultaneously; (6) subjecting the mixture in the mold to a temperature in the range of about 1400° C. to 2000° C. and a pressure of at least 50 kilobars a combination of temperature and pressure at which diamond is thermodynamically stable or is in equilibrium with graphite; (7) maintaining the pressure and temperature for a period of time; (8) cooling the whole assembly; and (9) releasing the pressure.

Pre-treating the diamond crystals before sintering, with a molten base or a molten salt is one of the key steps for producing high quality thermostable polycrystalline diamond. The polycrystalline diamond body thus obtained has many advantages over products obtained without pre-treating the diamond crystals with molten base or molten salt. For instance, the wear resistance of the former after high temperature treatment is far better than that of the latter.

According to the present invention, there is also provided a polygonal graphite mold with walls of equal thickness useful in the production of polygonal polycrystalline diamond bodies. The mold is a polygonal prism with a polygonal cavity of identical shape but smaller such that the walls of the mold are of the equal thickness. The relative wear resistance of the polycrystalline diamond body made by using this mold is substantially uniform throughout the body.

Thermostable polycrystalline diamond products with different characteristics can be obtained by controlling the grit size distribution of the diamond crystals, the amount of silicon, the type of additives, the ratio in which they are mixed and the sintering temperature and pressure.

DETAILED DESCRIPTION OF THE INVENTION

Figure 1:
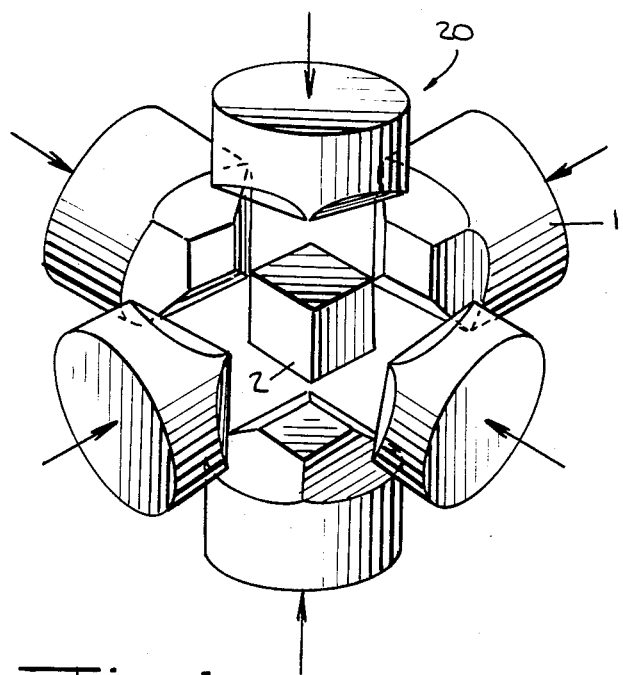
FIG. 1 is a perspective illustration of a preferred high-presure, high-temperature apparatus and cubic sample holder for sintering diamond particles.

The starting material for the present invention may be ordinary synthetic diamond, boron-doped synthetic diamond or natural diamond. The grit size of the starting diamond crystals may vary within the range of from about 1 to about 150 microns, preferably from about 1 to about 100 microns. The particular size or sizes of the diamond crystals used depends largely on the final application of the polycrystalline diamond product. For example, diamonds finer than 50 microns are preferred for cutting tools, while those coarser than 50 microns are preferred for drilling bits. It is to be noted that for drilling bits, the grit size used depends on the hardness of the formation: finer grits are preferred for soft rocks while coarser grits are recommended for medium to hard rocks.

According to the present invention, silicon (Si) or a blend of silicon and other substances is added as a bonding agent. The other substances may be selected from the group consisting of boron (B), elements from Groups $IV_B$, $V_B$, $VI_B$ of the periodic table: such as, titanium (Ti), vanadium (V), chromium (Cr), zirconium (Zr), niobium (Nb), molybdenum (Mo); element of the lanthanum (La) series; hafnium (Hf); elements from Group $VIII_B$ of the periodic table, such as nickel (Ni), cobalt (Co) and alloys thereof, and compounds such as silicon carbide (SiC) and boron carbide ($B_4C$).

The grit size of the bonding agent is finer than that of the grit size of the diamond crystals, preferably within the range of from 1 to 50 microns.

Silicon may be selected as the sole bonding agent. In such a situation, the diamond crystals may be present in an amount of from about 70% to about 99%, preferably from about 85% to about 95%, by weight of the total weight of the materials mixed.

Besides silicon powder, other substance or substances preferably boron, titanium, nickel, cobalt, zirconium, niobium, molybdenum, vanadium, silicon carbide, boron carbide, or mixtures thereof may be selected. The diamond crystals and the selected bonding agent are blended according to the following proportions:

| | |
|---|---|
| diamond crystal | 70%–99%, preferably 85%–95%, |
| additive: | |
| Si | 1%–30%, preferably 5%–15%, |
| B | 0–5%, preferably 0–1%, |
| Ti | 0–15%, preferably 0–5%, |
| Ni, Co | 0–5%, preferably 0–3%, |
| Zi, Nb, Mo, V | 0–2%, preferably 0–2%, |
| $B_4C$, SiC | 0–5%, preferably 0–5%, |

The total amount of bonding agent other than silicon is less than the total amount of silicon in the mixture. The amount of the diamond crystals and the bonding agent depend on the final application of the product.

According to the present invention, the diamond crystals are pretreated in a molten base or molten salt before they are mixed with the selected additive or additives. The pretreated diamond crystals should be mixed thoroughly with the bonding agent, such as by using a ball mill. The diamond is pretreated as follows:

A base such as solid sodium hydroxide, potassium hydroxide, or a salt such as sodium carbonate, sodium nitrate, potassium nitrate and diamond crystals are placed in a silver crucible or similar device, the weight ratio of the base or salt to diamond crystals is in the range of from 3:1 to 6:1. The mixture is then heated to a temperature to melt the base or salt but below the decomposition temperature of the salt, when a salt is used. For example, for sodium hydroxide, potassium hydroxide, sodium nitrate or a mixture of sodium carbonate and sodium nitrate, the temperature for heating the mixture is in the range of from about 600° C. to about 700° C. The temperature is maintained for 5 minutes to 1 hour. The mixture is cooled to a solid state and hot water is added to dissolve the base or salt. The diamond crystals are removed from the solution and washed with dilute acid, preferably dilute hydrochloric acid and again rinsed with hot water several times. The diamond crystals are then dried and mixed with a bonding agent to make polycrystalline diamond.

The surface of the diamond crystals thus pretreated is rough and lustrous. The amount of impurities in the treated diamond crystals is less than 0.01% by weight.

Pre-treating the diamond crystals, before sintering, with a molten base or molten salt is a key step for producing high quality thermostable polycrystalline diamond. The polycrystalline diamond body obtained from pre-treated diamond crystals has many advantages over those products obtained without pre-treated diamond crystals. For instance, the wear resistance is 50% to 100% higher, and will not degrade after being subjected to high temperature.

Figure 2:
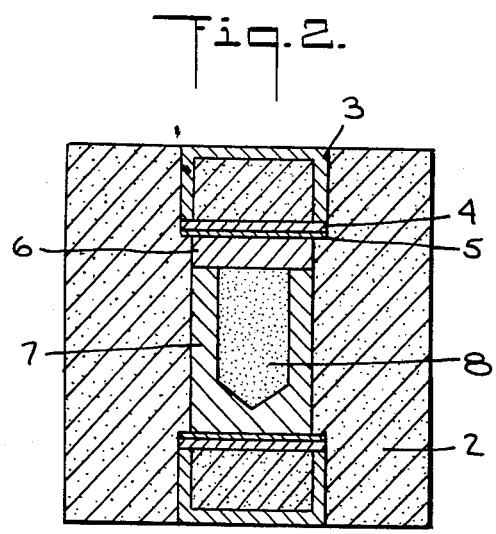
FIG. 2 is a cross-sectional view of the sample holder shown in FIG. 1.

As shown in FIG. 2, the graphite mold used in the present invention consists essentially of three parts: mold body (7), cavity (8) and top lid (6). The mold body and lid may be made from sintered graphite rod or other sintered graphite products, such as spectroscopic grade graphite electrode. The cross sectional view of cavity (8) is usually round, but may be square or trigonal. The mixture of the pre-treated diamond and a bonding agent is packed into cavity (8).

Figures 4A, 4B, 4C, 4D:
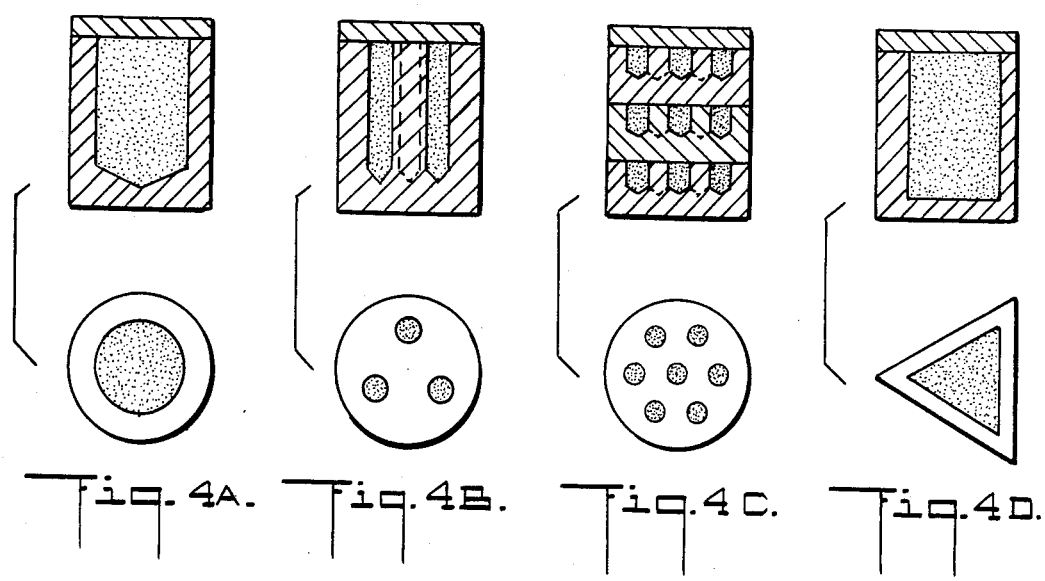
FIGS. 4A, 4B, 4C, and 4D are the cross-sectional and vertical views of alternative forms of the mold.

The graphite mold in the present invention may be a single cavity mold as shown in FIG. 4(a), a multi-cavity mold as shown in FIG. 4(b) or a multi-layer mold as shown in FIG. 4(c).

The trigonal graphite mold as shown in FIG. 4(d) is a new mold provided according to the present invention. The mold has a density of at least 1.6 g/cm³, a Shore hardness of at least 35 and a degree of graphitization of greater than 70%. The body of the mold is a trigonal or other polygonal shaped prism having a cavity with the same shape, so that the walls are of equal thickness.

The relative wear resistance of the polycrystalline diamond body made by using the mold is substantially uniform. That is to say, the wear resistance of the edges of the prism is substantially the same as that of the side surfaces.

After the mixture of diamond crystals and the bonding agent is packed into cavity (8) of the graphite mold, the graphite mold is placed into the hole of the preformed sample cube (2) as shown in FIG. 2. The opposite ends of the graphite mold are closed by heat-resistant metallic disks (4) and copper lamellae (5) and current conducting rings or caps (3) with pyrophyllite plugs therein.

After sample cube (2), preferably made of pyrophyllite, has been assembled, it is then positioned in a suitable apparatus capable of producing the pressure and temperature required for sintering the material. A particularly useful apparatus is the cubic press represented in FIG. 1. The cubic press (20) has three pairs of identical anvils (1). Each pair of opposing anvils move toward or away from each other rectilinearly along a common axis. When the anvils converge, the six faces engage the cubic faces of sample cube (2). At least one pair of the anvils is insulated from the frame (not shown) of the press (20) and is connected to a source of electric current.

Sample cube (2) is situated within cubic press (20) so that the pair of electrically energized anvils are in contact with rings or caps (3). Accordingly, electric current can be delivered from the anvils through the metallic rings or caps (3) to the corresponding disks (4) and copper lamellae (5). Because of the high electrical resistance of graphite, the required high temperature is produced. The anvils are moved to bear simultaneously on sample cube (2) until a desired operating pressure is reached.

Figure 6:
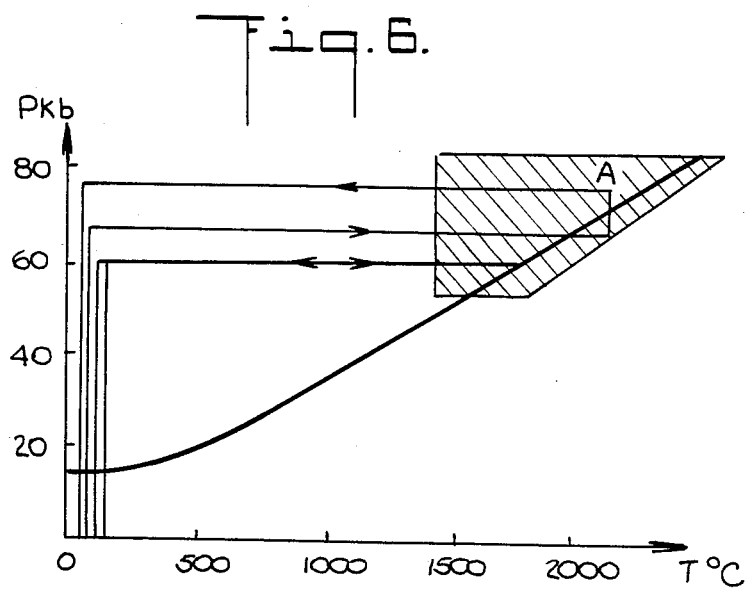
FIG. 6 is a graphical representation of the pressure-temperature zones suitable for the present invention.

According to the present invention, the pressure employed is at least 50 kilobars, preferably from about 50 to about 80 kilobars and the temperature employed ranges from about 1400° to about 2000° C. Suitable pressure and temperature zones are shown in FIG. 6. Zone A is within the diamond stable region and near the diamond-graphite equilibrium line, the main part of the A being within the diamond stable region. The pressure and temperature are maintained for a period of time, preferably from 10 seconds to several minutes. The electric current is cut off and the whole assembly allowed to cool down to ambient temperature before the pressure is released.

Different ways of increasing the pressure and temperature may be adopted. The pressure may first be increased to the highest desired level, then the temperature is increased to the highest desired level and the pressure and temperature are maintained for a period of time. Alternatively, the pressure may first be increased to a level of about 90% of the highest level desired, then the temperature is increased to the highest level desired followed by increasing the pressure to the highest level and maintained at these levels for a period of time. A third alternative is to increase the pressure to a level of about 90% of the highest level desired followed by increasing simultaneously the temperature and pressure to the highest level, and then maintained at these levels for a period of time.

Figure 3:
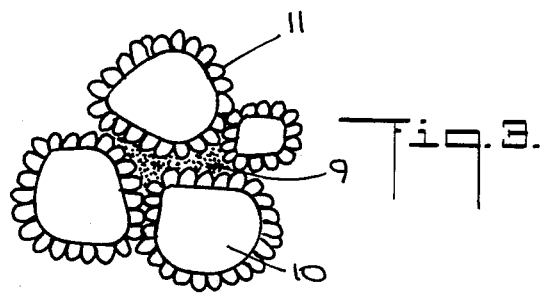
FIG. 3 is a schematic illustration of the local microstructure of the product of the present invention.

After completion of the synthesis cycle, the polycrystalline diamond body can be recovered from the graphite mold. The polycrystalline diamond body according to the present invention is similar to polycrystalline diamond bodies of the prior art: it is isotropic and has no cleavage surface, the diamond crystals being randomly oriented in the polycrystalline diamond body. However, the polycrystalline diamond body according to the present invention has its own unique structure. As shown in FIG. 3, the diamond crystals (10) are uniformly distributed throughout the polycrystalline diamond body, and the surface of the diamond crystals (10) are covered with β-silicon carbide (11) an intermediate transition phase; and chemically and adherently bonded therewith. The diamond crystals together with β-silicon carbide (11) form an uninterrupted framework throughout the polycrystalline diamond body; the interstices of which are filled with elemental silicon or a silicon-containing refractory phase (9) which is chemically and adherently bonded with β-silicon carbide (11). The said silicon-containing refractory phase contains a multi-component solid solution such as Si-Ni, Si-B-C, Si-Ti-B, Si-Ni-Ti-B and/or a compound, such as $Ni_5Si_2$, $B_4C$, TiB, TiSi, or alloys of nickel and silicon.

Figure 7:
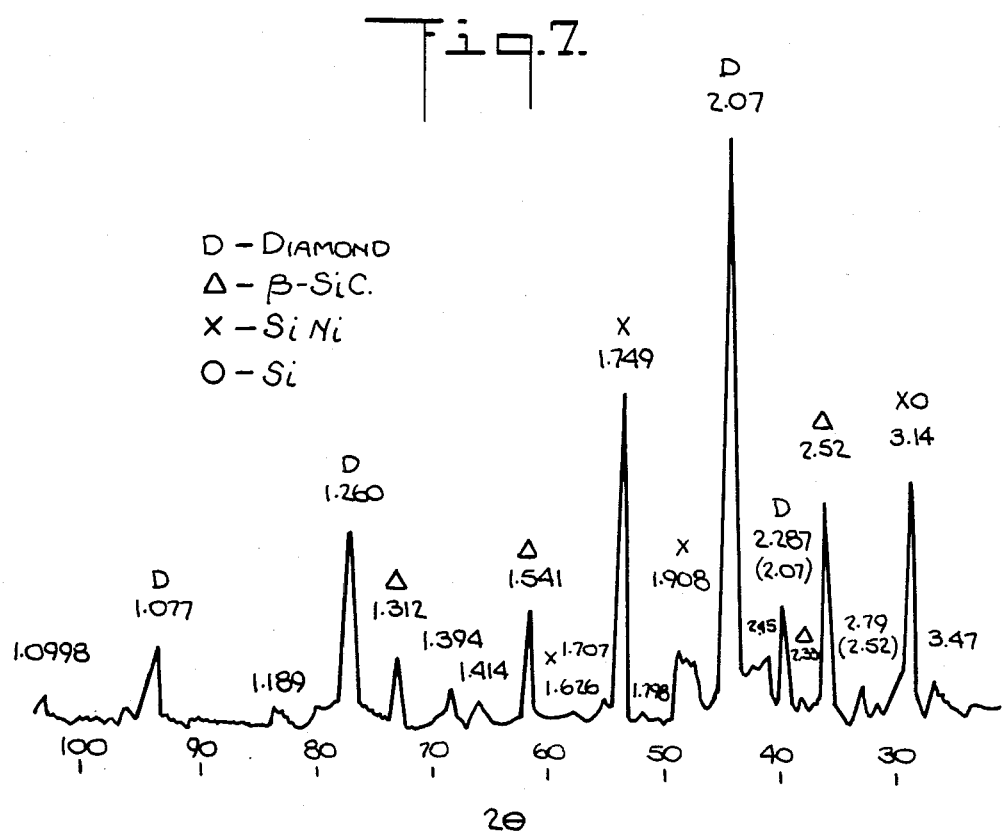
FIG. 7 is an X-ray powder diffraction diagram of the polycrystalline diamond of the present invention.

The description of the microstructure of the present polycrystalline diamond body is supported by X-ray diffraction analysis. In FIG. 7, diffraction peaks of β-silicon carbide are significantly presented. A comparison the standard X-ray diffraction lines of β-silicon Carbide (SiC) and the Experimental diffraction lines are shown in Table 1.

TABLE I

| Experimental | | Standard β-SiC | | |
|---|---|---|---|---|
| d/n* | $I/I_o$ | d/n* | $I/I_o$ | hkl |
| 2.52 | 100 | 2.51 | 100 | 111 |
| 2.15 | 20 | 2.17 | 20 | 200 |
| 1.54 | 60 | 1.54 | 63 | 220 |
| 1.32 | 50 | 1.31 | 50 | 311 |
| | | 1.255 | 5 | 222 |

*Cu $K_\alpha K_\beta$

Figure 8:
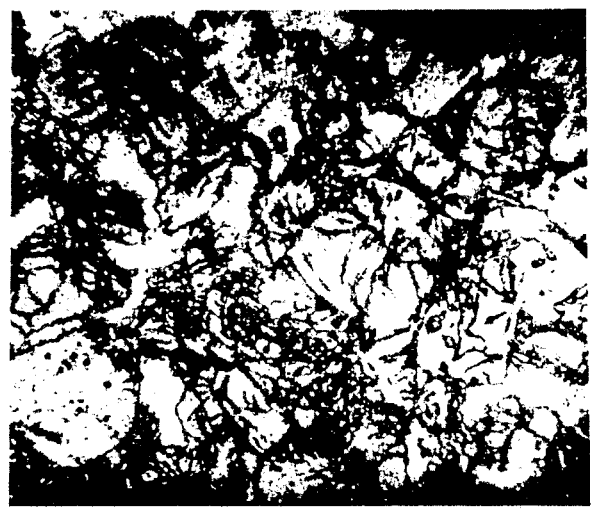
FIG. 8 is a microphotograph of a polished cross-section of the polycrystalline diamond body of the present invention.

FIG. 8 is a microphotograph of a polished cross-section of the polycrystalline diamond body of the present invention (magnified 250×). The microstructure of the present polycrystalline diamond body shown in FIG. 3 and described herein is demonstrated by examining the refractivity of the polished cross-section.

The polycrystalline diamond products of the present invention may be directly molded into final configurations which are round, triangular, square disks or blocks with length to thickness ratio of from 1:4 to 8:1, preferably from 1:4 to 4:1.

An important advantage of the present product is that it has a high thermostability. It can withstand high temperatures of about 1250° C. or above in the presence of a non-oxidizing atmosphere such as $CO$, $H_2$, $N_2$, etc. The wear resistance of the product remains the same or even improves to some extent after being subjected to high temperatures.

Figure 5:
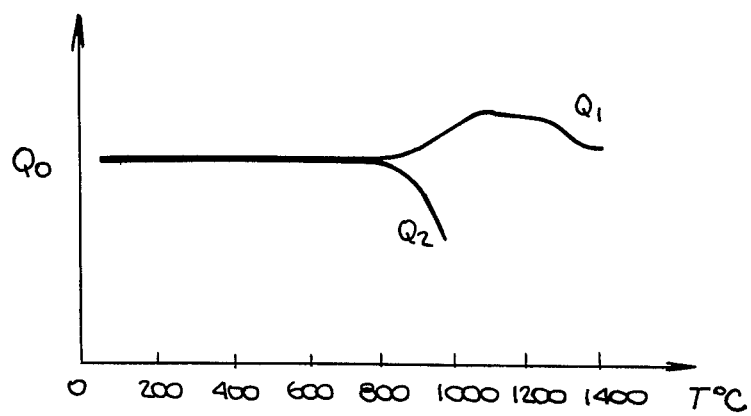
FIG. 5 is a diagram comparing the change in wear resistance with temperature of a polycrystalline diamond of the present invention to a polycrystalline diamond of the prior art.

FIG. 5 is a graph representing the change in wear resistance after the product has been heated. Curve $Q_1$ shows the change of wear resistance with treating temperature for the polycrystalline diamond product of the present invention and curve $Q_2$ shows the change in wear resistance for the commonly used polycrystalline diamond product with an alloy substrate. Curve $Q_2$ shows that the wear resistance suffered a sharp decline at temperatures over 700° C., whereas curve $Q_1$ shows that the wear resistance has improved to some extent with increasing temperature.

The polycrystalline diamond product of the present invention can be made into tools, such as mining and oil drilling bits, reaming shells and gags by means of high temperature powder metallurgy using hard metals as the matrix. The drilling bits, reaming shells and gags made from polycrystalline diamond of the present invention are suitable for drilling in soft rocks with a hardness below 6 to 7 degrees, such as lime rock, marble, shale, etc; and in medium to hard rocks with coarse grains, such as sedimentary rock. The results obtained in drilling medium to hard rocks and non uniform abrasive formations are much better than those obtained with drill bits impregnated or surface-set with single diamond crystals. The product of the present invention is also suitable for making other tools or articles such as wire drawing dies, cutting tools, dressers, testers, styli and articles with wear-resistant components.

The following examples are illustrative of the present invention.

EXAMPLE 1

Diamond powder were size-graded to contain about 25% by weight of 100 microns size particles, about 25% by weight 80 microns size particles, about 25% by weight 40 microns size particles, and about 25% by weight 20 microns size particles.

1 part by weight of the sized graded diamond crystals and 5 parts by weight of solid sodium hydroxide were placed in a silver crucible. The mixture was heated to 650° C. to melt the sodium hydroxide. The temperature was maintained for 30 minutes and then cooled to a solid state. Hot water was added to dissolve the sodium hydroxide. The diamond crystals were separated from the solution, washed with dilute hydrochloric acid to neutralize the sodium hydroxide, rinsed with hot water several times and then dried.

75 parts by weight of the pre-treated diamond crystals, 22 parts by weight of 99.99% pure silicon powder with a particle size in the range from about 1 to about 20 microns, and 3 parts by weight of 99.9% pure nickel powder were mixed. The mixture was placed into a pre-formed graphite mold and assembled into a sample cube as shown in FIG. 2. The assembled sample cube was then placed into a cubic press.

The pressure was raised to 55 kbar. and then the temperature was raised to 1600° C. The temperature and pressure were maintained for 30 seconds. Then the entire assembly was cooled to ambient temperatures before releasing the pressure.

The polycrystalline diamond product thus obtained has good wear resistance and impact strength and can withstand temperatures higher than 1250° C. in a non-oxidizing atmosphere.

EXAMPLE 2

Example 1 was repeated except that cobalt powder was substituted for nickel powder. The properties of the product were similar to that of Example 1.

EXAMPLE 3

Diamond powder was size-graded to contain about 30% by weight of 40 microns particles, about 50% by weight 20 microns particles and, about 20% by weight 10 microns particles.

The diamond powder was then pre-treated as described in Example 1. 85 parts by weight of the pre-treated diamond powder, and 10 parts by weight of 99.99% pure silicon powder with a particle size smaller than 28 microns, 3 parts by weight of boron carbide with a particle size smaller than 28 microns, and 2 parts by weight of 99.9% pure nickel powder were mixed. The mixture was placed into a pre-formed graphite mold and assembled into a sample cube as shown in FIG. 2. The assembled sample cube was placed into a cubic press. The pressure was raised to 77 kbar. and then the temperature was raised to 2000° C.

The temperature and pressure were maintained for 40 seconds. The entire assembly was cooled to ambient temperature before releasing the pressure.

The polycrystalline diamond product thus obtained has good wear resistance and impact strength and can withstand temperatures higher than 1250° C. in a non-oxidizing atmosphere.

EXAMPLE 4

Example 3 was repeated except that silicon carbide powder was substituted for the boron carbide powder. The properties of the product were similar to that of Example 3.

EXAMPLE 5

Example 3 was repeated except that cobalt powder was substituted for nickel powder. The properties of the product were similar to that of Example 3.

EXAMPLE 6

Diamond powder was size-graded to contain about 30% by weight of 60 microns size particles, about 50% by weight 40 microns size particles, and about 20% by weight 20 microns size particles. The size graded diamond powder was pre-treated as described in Example 1.

90 parts by weight of the pre-treated diamond powder and 9 parts by weight of 99.99% pure silicon powder with a particle size in the range of from about 1 to about 20 microns and 1 parts by weight of 99.9% pure boron powder were mixed. The mixture was placed into a pre-formed graphite mold and assembled into a sample cube as shown in FIG. 2. The sample cube was placed into a cubic press. The pressure was increased to 60 kbar., and then simultaneously the temperature raised to 1900° C. and the pressure was raised to 65 kbar. The total time for raising and maintaining the temperature and pressure was 2 minutes. The entire assembly was cooled to ambient temperatures before releasing the pressure.

The polycrystalline diamond product thus obtained has good wear resistance and impact strenglh and can withstand temperatures higher than 1250° C. in a non-oxidizing atmosphere.

EXAMPLE 7

Diamond powder was size-graded to contain particles in the range of from 40 to 60 microns. The size-graded diamond powder was pre-treated as described in Example 1.

85 parts by weight of the pre-treated diamond powder and 13 parts by weight of 99.99% pure silicon powder with particle size in the range of from about 1 to about 20 microns and 2 parts by weight of 99.9% pure nickel powder were mixed. The mixture was placed into a pre-formed graphite mold and assembled into a sample cube as shown in FIG. 2. The sample cube was placed into a cubic press. The pressure was raised to 60 kbar., the temperature was raised to 1850°, and then the pressure was raised to 65 kbar. The temperature and pressure were maintained for 50 seconds and the assembly was cooled to ambient temperatures before releasing the pressure.

The polycrystalline diamond product thus obtained has good wear resistance and impact strength and can withstand temperatures higher than 1250° C. in a non-oxidizing armosphere.

EXAMPLE 8

Example 7 was repeated except that cobalt powder was substituted for nickel powder. The properties of the product thus obtained were similar to that of Example 7.

EXAMPLE 9

Diamond crystals were size-graded to contain particles in the range of from about 20 to about 60 microns and pre-treated as described in Example 1.

85 parts by weight of the pre-treated diamond crystals and 13 parts by weight of 99.99% pure silicon powder with a particle size in the range of from about 10 to about 40 microns, 1 part by weight of 99.9% pure titanium and 1 part by weight of 99.9% pure boron powder were mixed. The mixture was placed into a pre-formed graphite mold and assembled into a sample cube as shown in FIG. 2. The sample cube was placed into a cubic press. The pressure was raised to 70 kbar., and then the temperature was raised to 1900° C. The temperature and pressure were maintained for 5 minutes. The whole assembly was cooled to ambient temperatures before releasing the pressure.

The polycrystalline diamond product thus obtained has good wear resistance and impact strength and can withstand temperatures higher than 1250° C. in a non-oxidizing atmosphere.

EXAMPLE 10

Diamond powder were size-graded to contain about 50% by weight of 40 microns size particles, about 30% by weight 30 microns size particles, and about 20% by weight 10 microns size particles. The size-graded diamond powder was then pre-treated as described in Example 1.

91 parts by weight of the pre-treated diamond crystals; and 8 parts by weight of 99.99% pure silicon powder with a particle size in the range of from about 1 to about 10 microns, 0.5 part by weight of 99.9% pure titanium powder, and 0.5 part by weight of 99.9% pure boron powder were mixed. The mixture was placed into a pre-formed graphite mold and assembled into a sample cube as shown in FIG. 2. The sample cube was placed into a cubic press. The pressure was raised to 62 kbar., and then the temperature was raised to 1800° C. The temperature and pressure were maintained for 1 minute. Then the whole assembly was cooled to ambient temperatures before releasing the pressure.

The polycrystalline diamond product thus obtained has good wear resistance and impact strength and can withstand temperatures higher than 1250° C. in a non-oxidizing atmosphere.

EXAMPLE 11

Diamond crystals were size graded to contain about 10% by weight 100 microns size particles and about 90% by weight 40 microns size particles. The size-graded diamond crystals were pre-treated as described in Example 1.

85 parts by weight of the pre-treated diamond crystals, 14 parts by weight of 99.99% pure silicon powder with a particle size in the range of from about 10 to about 40 microns and 1 part by weight of 99% pure zirconium powder with a particle size in the range of from about 10 to about 40 microns were mixed. The mixture was then placed into a pre-formed graphite mold and assembled into a sample cube as shown in FIG. 2. The sample cube was placed into a cubic press. The pressure was raised to 65 kbar., and then the temperature was raised to 1850° C. The temperature and pressure were maintained for 1 minute. Then the whole assembly was cooled to abient temperatures before reducing the pressure.

The polycrystalline diamond product thus obtained has good wear resistance and impact strength and can withstand temperatures higher than 1250° C. in a non-oxidizing atmosphere.

EXAMPLE 12

Example 11 was repeated except that molybdenum powder was substituted for zirconium powder. The properties of the product thus obtained were similar to that of Example 11.

EXAMPLE 13

Example 11 was repeated except that niobium powder was substituted for the zirconium powder. The properties of the product thus obtained were similar to that of Example 11.

EXAMPLE 14

Example 11 was repeated except that vanadium powder was substituted for the zirconium powder. The properties of the product thus obtained were similar to that of Example 11.

EXAMPLE 15

Diamond powder were size-graded to contain about 30% by weight of 80 microns size particles, about 30% by weight 60 microns size particles, about 40% by weight 40 microns size particles. The size-graded diamond powder was then pre-treated as described in Example 1.

70 parts by weight of the pre-treated diamond crystals; and 30 parts by weight of 99.99% pure silicon powder with a particle size in the range of from about 20 to about 40 microns were mixed. The mixture was placed into a pre-formed graphite mold and assembled into a sample cube as shown in FIG. 2. The sample cube was placed into a cubic press. The pressure was raised to 60 kbar., and then the temperature was raised to 1800° C. The temperature and pressure were maintained for 1 minute. The whole assembly was cooled to ambient temperatures before releasing the pressure.

The polycrystalline diamond product thus obtained has good wear resistance and impact strength and can withstand temperatures higher than 1250° C. in a non-oxidizing atmosphere.

EXAMPLE 16

Diamond crystals were size-graded to contain about 25% by weight 150 microns size particles, about 25% by weight 100 microns size particles, about 25% by weight 60 microns size particles, about 25% by weight 40 microns.

6 parts by weight of solid sodium nitrate and 1 part by weight of diamond crystals were placed in a silver crucible. The mixture was heated to 600° C. and was melted in the crucible. The temperature was maintained for 20 minutes and then cooled the mixture to solid state. Hot water was added to dissolve the sodium nitrate and then the diamond was separated from the solution. The diamond crystals were washed with dilute hydrochloric acid, and then washed with hot water several times. The diamond crystals were then separated from the water and dried.

70 parts by weight of the pre-treated diamond crystals, 25 parts by weight of 99.99% pure silicon powder with a particle size in the range of from about 28 to about 40 microns and 5 parts by weight of 99.9% pure nickel powder were mixed. The mixture was placed into a pre-formed graphite mold and assembled into a sample cube as shown in FIG. 2. The sample cube was placed in a cubic press. The pressure was raised to 65 kbar., and then the temperature was raised to 1800° C. The temperature and pressure were maintained for 2 minutes. The entire assembly was cooled to ambient temperatures before releasing the pressure.

The polycrystalline diamond product thus obtained has good wear resistance and impact strength and can withstand temperatures higher than 1250° C. in a non-oxidizing atmosphere.

EXAMPLE 17

Diamond crystals were size-graded to contain about 25% by weight 40 microns size particles, about 25% by weight were 28 microns size particles, about 25% by weight were 10 microns size particles, about 25% by weight 5 microns size particles.

The size-graded diamond crystals were pre-treated as described in Example 1. 90.5 parts by weight of the pre-treated diamond crystals and 8.5 parts by weight of 99.99% silicon powder with a particle size in the range of from about 1 to about 10 microns, 0.5 part by weight of 99.9% pure titanium powder and 0.5 part by weight of 99.9% pure boron powder were mixed. The mixture was placed into a pre-formed trigonal graphite mold with walls of equal thickness as shown in FIG. 4(d). The density of the mold material was $1.7\pm0.1$ g/cm$^3$; with a Shore hardness of 55; and 83% degree of graphitization. A trigonal cavity was pre-formed in the sample cube as shown in FIG. 2. The sample cube was assembled and placed into a cubic press. The pressure was raised to 60 kbar. and then the temperature was raised to 1750° C. The temperature and pressure were maintained for 1 minute. The entire assembly was cooled to ambient temperatures before releasing the pressure.

The polycrystalline diamond product thus obtained has good wear resistance and impact strength and can withstand temperatures higher than 1250° C. in a non-oxidizing atmosphere.

The polycrystalline diamond product thus obtained was a triangular prism. The edges of it were substantially straight with no observable defects. The relative wear resistance of the body was uniform, that is, the wear resistance at the edges is substantially the same as that at the side surfaces of the prism.

What is claimed is:

1. A thermostable polycrystalline diamond body comprising about 70% to 99% by weight of diamond crystals with a grit size in the range of about 1 to about 150 microns uniformly distributed therein, the surface of said diamond crystals being covered with β-silicon carbide, and chemically and adherently bonded therewith to form an uninterrupted framework, the interstices of which are filled with elemental silicon which is chemically and adherently bonded to said β-silicon carbide.

2. A thermostable polycrystalline diamond body comprising about 70% to about 99% by weight of diamond crystals with a grit size in the range of about 1 to about 150 microns uniformly distributed therein, the surface of said diamond crystals being covered with β-silicon carbide and chemically and adherently bonded therewith to form an uninterrupted framework, the interstices of which are filled with a silicon-containing refractory phase chemically and adherently bonded to β-silicon carbide, said silicon-containing refractory phase consisting essentially of elemental silicon and one or more substances selected from the group consisting of a silicide of one or more elemental materials, a solution of one or more elemental materials in silicon, boron carbide and silicon carbide, said elemental material being selected from the group consisting of boron, titanium, nickel, cobalt, zirconium, niobium, molybdenum, vanadium, hafnium, chromium, an element of the lanthanum series of the periodic table and alloys thereof, the total amount of the elemental materials, boron carbide or silicon carbide being less than the content of silicon either in elemental form or in combined form.

3. A thermostable polycrystalline diamond body according to claim 2, wherein the grit size of the diamond crystals is in the range of from about 1 to about 100 microns, and the diamond crystals are present in an amount of about 85% to about 95% by weight of the total weight of said body.

4. A thermostable polycrystalline diamond body according to claim 2, wherein said elemental materials are selected from the group consisting of boron, nickel, cobalt, titanium, zirconium, niobium, molybdenum and vanadium.

5. A method for preparing a thermostable polycrystalline diamond body comprising the steps of:
   (1) pre-treating diamond crystals with a molten base or a molten salt;
   (2) mixing the pre-treated diamond crystals uniformly with silicon powder or a blend of silicon powder and a material which will form a refractory phase with silicon;
   (3) placing the mixture into a mold, with a predetermined cavity shape;
   (4) placing the mold into a pre-formed pyrophyllite sample cube;
   (5) placing the sample cube into an apparatus capable of simultaneously producing high pressure along three axes and high temperature;
   (6) subjecting the mixture in the mold to a temperature in the range of about 1400° C. to about 2000° C. and a pressure of at least 50 kilobars;
   (7) maintaining the pressure and temperature for a period of time;
   (8) cooling the apparatus; and
   (9) releasing the pressure.

6. A method acording to claim 5, wherein the diamond crystals are made of synthetic diamond, boron-doped synthetic diamond, natural diamond or a mixture thereof, and has a grit size of which ranges from about 1 to about 150 microns.

7. A method according to claim 5, wherein said molten base or salt is selected from the group consisting of sodium hydroxide, potassium hydroxide, sodium carbonate, sodium nitrate, potassium nitrate and mixtures thereof.

8. A method according to claim 7, wherein the molten base or salt is sodium hydroxide, potassium hydroxide, or a mixture of sodium carbonate and sodium nitrate.

9. A method according to claim 5, wherein the step of pre-treating said diamond crystals consists essentially of following steps:
   (1) treating said diamond crystals in the molten base or salt for about 5 minutes to about 1 hour;
   (2) cooling the mixture of the diamond and the base or salt to solid state;
   (3) dissolving the mixture with hot water;
   (4) removing the diamond crystals from the solution;
   (5) washing the diamond crystals with a dilute acid;
   (6) rinsing the diamond crystals with hot water several times;
   (7) removing the diamond crystals from water; and
   (8) drying the diamond crystals.

10. A method according to claim 9, wherein the acid is dilute hydrochloric acid.

11. A method according to claim 5, wherein the amount of the diamond crystals in the mixture is in the range of from about 70% to about 99% by weight of the total weight of the mixture, and the balance as silicon powder with a particle size which is finer than that of the diamond crystals.

12. A method according to claim 11, wherein the grit size of said silicon powder ranges from 1 to 50 microns.

13. A method according to claim 5, wherein the amount of the diamond crystals in the mixture is in the range of from about 70% to less than 99% by weight of the total weight of the mixture, with the balance a blend of silicon powder and a powder of one or more substances selected from the group consisting of boron carbide, silicon carbide, boron, titanium, nickel, cobalt, zirconium, niobium, molybdenum, vanadium, hafnium, chromium, an element of the lanthanum series of the periodic table and alloys thereof, the total amount of the substance being less than the amount of silicon in the mixture, and the grit size of the silicon powder and said powder substance being finer than that of the diamond crystals.

14. A method according to claim 13, wherein said powder substance is selected from the group consisting of boron carbide, silicon carbide, boron, titanium, nickel, cobalt, zirconium, niobium, molybdenum and vanadium.

15. A method according to claim 14, wherein the grit size of said silicon powder and the powder substance ranges from 1 to 50 microns.

16. A method according to claim 13, wherein the amount of diamond crystals is in the range of from about 85% to less than about 95% by weight of the mixture, and the amount of silicon powder is in the range of from about 5% to less than about 15% by weight of the mixture.

17. A method according to claim 5, wherein the pressure is in the range of from 50 to about 80 kilobars.

18. A method according to claim 5, wherein the pressure is raised to the highest level desired, followed by raising the temperature to the highest level desired, and maintaining the pressure and temperature for from about 10 seconds to about 10 minutes.

19. A method according to claim 5, wherein the pressure is raised to a level of about 90% of the highest level desired, followed by raising the temperature to the highest level desired and followed by raising the pressure to the highest level desired, maintaining the desired pressure and the temperature for from about 10 seconds to about 10 minutes.

20. A method according to claim 5, wherein the pressure is raised to a level of about 90% of the highest level desired followed by raising the temperature and pressure to the highest level simultaneously, and maintaining the pressure and temperature for a period of time up to about 10 minutes.

21. A thermostable polycrystalline diamond body prepared according to the method of claim 5.

22. An article prepared from a polycrystalline diamond body according to claims 1, 2, 3, 4 or 21.

23. A thermostable polycrysalline diamond body according to claim 4 wherein the elemental material is boron and is present in an amount up to about 5% by weight of the total weight of the polycrystalline diamond body.

24. A thermostable polycrysalline diamond body according to claim 4 wherein the elemental material is nickel and is present in an amount up to about 5% by weight of the total weight of the polycrystalline diamond body.

25. A thermostable polycrysalline diamond body according to claim 4 wherein the elemental material is cobalt and is present in an amount up to about 5% by weight of the total weight of the polycrystalline diamond body.

26. A thermostable polycrysalline diamond body according to claim 4 wherein the elemental material is titanium and is present in an amount up to about 15% by weight of the total weight of the polycrystalline diamond body.

27. A thermostable polycrysalline diamond body according to claim 4 wherein the elemental material is zirconium and is present in an amount up to about 2% by weight of the total weight of the polycrystalline diamond body.

28. A thermostable polycrysalline diamond body according to claim 4 wherein the elemental material is niobium and is present in an amount up to about 2% by weight of the total weight of the polycrystalline diamond body.

29. A thermostable polycrysalline diamond body according to claim 4 wherein the elemental material is molybdenum and is present in an amount up to about 2% by weight of the total weight of the polycrystalline diamond body.

30. A thermostable polycrysalline diamond body according to claim 4 wherein the elemental material is vanaduim and is present in an amount up to about 2% by weight of the total weight of the polycrystalline diamond body.

31. A method according to claim 14, wherein the powder is boron carbide and is present in an amount of up to about 5% by weight of the total weight of the mixture.

32. A method according to claim 14, wherein the powder is silicon carbide and is present in an amount of up to about 5% by weight of the total weight of the mixuture.

33. A method according to claim 14, wherein the powder is boron and is present in an amount of up to about 5% by weight of the total weight of the mixture.

34. A method according to claim 14, wherein the powder is titanium and is present in an amount of up to about 15% by weight of the total weight of the mixture.

35. A method according to claim 14, wherein the powder is nickel and is present in an amount of up to about 5% by weight of the total weight of the mixture.

36. A method according to claim 14, wherein the powder is cobalt and is present in an amount of up to about 5% by weight of the total weight of the mixture.

37. A method according to claim 14, wherein the powder is zirconium and is present in an amount of up to about 2% by weight of the total weight of the mixture.

38. A method according to claim 14, wherein the powder is niobium and is present in an amount of up to about 2% by weight of the total weight of the mixture.

39. A method according to claim 14, wherein the powder is molybdenum and is present in an amount of up to about 2% by weight of the total weight of the mixture.

40. A method according to claim 14, wherein the powder of boron substance is vanadium and is present in an amount of up to about 2% by weight of the total weight of the mixture.

41. A method according to claim 16 wherein the powder is boron carbide and is present in an amount up to about 5% by weight of the total weight of the mixture.

42. A method according to claim 16 wherein the powder is silicon carbide and is present in an amount up to about 5% by weight of the total weight of the mixture.

43. A method according to claim 16 wherein the powder is boron and is present in an amount up to about 5% by weight of the total weight of the mixture.

44. A method according to claim 16 wherein the powder is titanium and is present in an amount up to about 5% by weight of the total weight of the mixture.

45. A method according to claim 16 wherein the powder is nickel and is present in an amount up to about 3% by weight of the total weight of the mixture.

46. A method according to claim 16 wherein the powder is cobalt and is present in an amount up to about 3% by weight of the total weight of the mixture.

47. A method according to claim 16 wherein the powder is zirconium and is present in an amount up to about 2% by weight of the total weight of the mixture.

48. A method according to claim 16 wherein the powder is niobium and is present in an amount up to about 2% by weight of the total weight of the mixture.

49. A method according to claim 16 wherein the powder is molybdenum and is present in an amount up to about 2% by weight of the total weight of the mixture.

50. A method according to claim 16 wherein the powder is vanadium and is present in an amount up to about 2% by weight of the total weight of the mixture.

* * * * *